March 17, 1959  V. D. ROOSA  2,877,754
TIMING CONTROL FOR FUEL PUMPS
Filed Nov. 15, 1956  2 Sheets-Sheet 1

INVENTOR.
VERNON D. ROOSA
BY
Lindsey and Prutzman
ATTORNEYS

INVENTOR.
VERNON D. ROOSA
BY
Lindsey and Prutzman
ATTORNEYS

United States Patent Office 2,877,754
Patented Mar. 17, 1959

2,877,754

TIMING CONTROL FOR FUEL PUMPS

Vernon D. Roosa, West Hartford, Conn.

Application November 15, 1956, Serial No. 622,381

14 Claims. (Cl. 123—139)

This invention relates to fuel injection pumps for internal combustion engines and more particularly to an improvement on such fuel injection pumps for automatically controlling the timing of the pumps in response to variations in engine load.

In the operation of internal combustion engines where fuel injection is employed, it is frequently the practice to advance the timing responsive to engine speed. In certain types of engines, however, it has been found that when the timing is advanced responsive to engine speed without regard to the amount of load on the engine, uneven cyclic combustion occurs at reduced load producing smoking and inefficient operation.

Accordingly, it is the primary object of the invention to provide a new and novel timing control for a fuel injection pump which varies the timing of the pump responsive to the load on the engine associated with the pump.

It is another object of the invention to provide such a timing control which may be quickly and easily adjusted to give maximum engine efficiency within a wide range of engine load and speed.

It is a further object of the invention to provide a new and novel metering valve for a fuel injection pump which automatically regulates both the fuel delivered to engine and the timing of fuel injection.

Other and further objects of the invention will be obvious upon an understanding of the illustrative embodiment about to be described, which will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

Figures 1, 2:
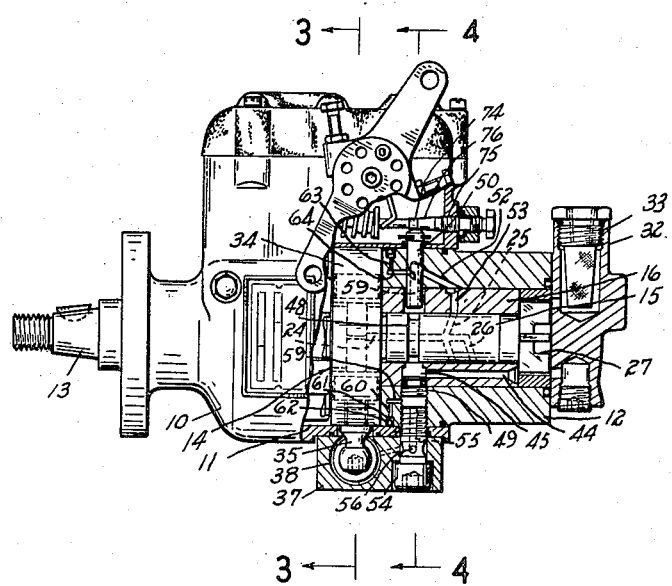
Fig. 1 is an elevation view partially in section of a fuel pump incorporating the invention.
Fig. 2 is a bottom view partially in section of the pump of Fig. 1.

The improvement of this invention is adapted for use with a fuel injection pump of the type used with internal combustion engines such as diesels. For the purpose of illustration, there is shown in Fig. 1 such a fuel injection pump, which is similar to that disclosed and claimed in my prior Patent No. 2,641,238, dated June 9, 1953. This pump comprises a main housing 10 containing a central bore 11 into one end of which is telescopically fitted an end housing 12. A pump shaft 13 is suitably journaled within the bore 11 of the pump and is arranged to be drivably connected to the engine with which the pump is associated. The driven pump shaft 13 is arranged to drive a cam operated injection pump suitably connected thereto and designated generally by numeral 14.

Figure 3:
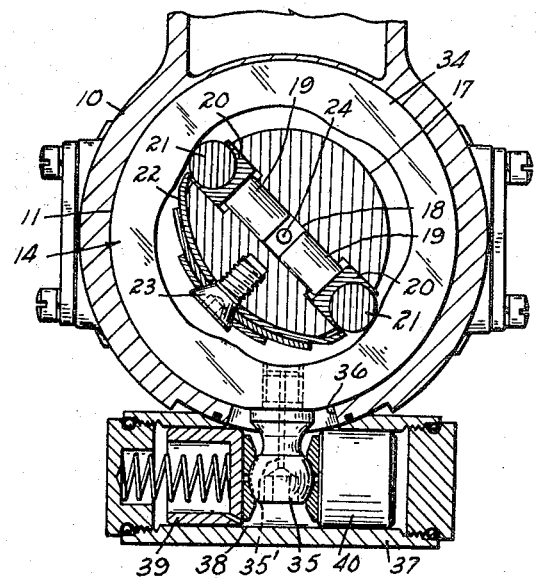
Fig. 3 is a fragmentary enlarged sectional view taken substantially along line 3—3 of Fig. 1.

The cam operated pump 14 comprises a rotor 15 rotatably journaled within a sleeve 16 referred to hereinafter as a hydraulic head and which is fixedly mounted within the end housing 12. As shown best in Fig. 3, the rotor 15 contains a head 17 having a transverse bore 18 in which a pair of pistons 19 are freely slidable. Each end of the bore 18 has an enlarged diameter and slidably receives a shoe 20 in which a roller 21 is mounted. The maximum outward radial movement of the shoes 20 is limited by the ends of a leaf spring 22 adjustably mounted by screw 23 on the rotor head 17. The rotor 15 contains a central bore 24 communicating with the transverse bore 18 at one end and with substantially radial, fuel charging or inlet port passages 25 and a fuel outlet port passage 26 at the other end. Mounted on the end of the rotor 15 opposite from the cam pump 14 is the rotor of a transfer or feed pump 27 by means of which fuel is conveyed to the fuel pump. The end housing 12 is closed by an end cap 32 which contains suitable passages and a fitting 33 so that a fluid connection can be made from a fuel reservoir (not shown) to the feed pump 27.

A normally stationary, but rotatably adjustable, ring cam 34 is arranged within the housing 10 concentrically with the rotor head 17 for engagement by the rollers 21 and contains a plurality of spaced rises around its inner periphery which actuate the plungers as the rotor is rotated. The cam 34 is provided with an adjusting arm 35 fixed to its outer periphery which extends through an opening 36 in the housing wall.

The arm 35 projects into the bore of a cylinder 38 provided in the attached block 37 and is biased in one direction by a spring loaded piston 39 slidably positioned within the cylinder bore. The arm 35 may be moved in the other direction by a slidable piston 40 the position of which is determined by the fuel pressure on its face. The piston 40 is dimensioned so that it does not have a tight fit with the wall of cylinder 38, and the fuel which escapes past the piston 40 in turn is vented through passageway 35' in the arm 35. As is well understood the position of the arm 35 and consequently the cam 34 determines the timing of the fuel pump. So far as the structure of the cam and the adjusting mechanism just described are concerned, these are generally similar to that disclosed and claimed in my prior Patent No. 2,660,992, dated December 1, 1953.

Figure 4:
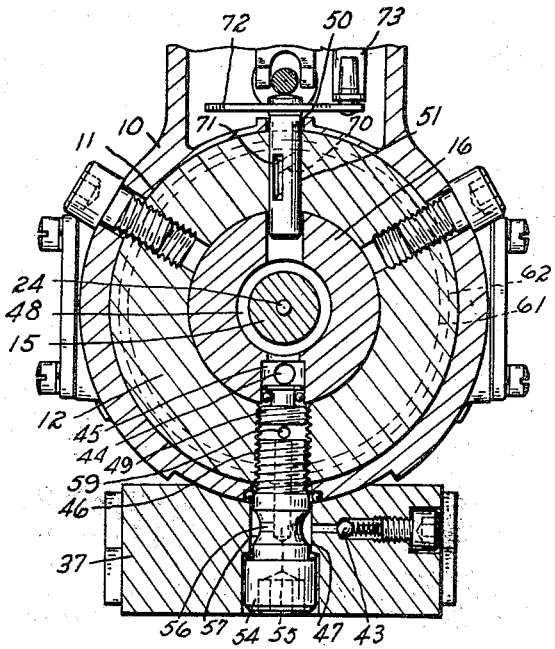
Fig. 4 is a fragmentary enlarged sectional view taken substantially along line 4—4 of Fig. 1.

As best shown in Figs. 1 and 4, a longitudinal passage 44 is provided within the hydraulic head 17 which communicates at one end with the outlet side of the feed pump 27 and at its other end with a transverse passage 45 extending radially of the hydrau.ic head 17. The passage 45 at its inner end faces a groove 48 in the rotor 15 which communicates at the opposite side with a transverse valve passageway 51 containing the valve 50. From thence, a diagonal passageway 52 carries the fuel to the port 53 with which the inlet ports 25 of the rotor register sequentially as the rotor is rotated.

The lower end of the passage 45, as viewed in Figs. 1–4, communicates with an internally threaded, radially aligned passage 46 in the housing and block 37 which in turn communicates through a suitable passage 47 in the block 37 with the cylinder bore 38. A one-way ball valve 43 is disposed in the passage 47.

The lower end of the passage 45 as viewed in Figs. 1 and 4 is blocked by a threaded plug 49 positioned within the threaded radial passage 46. The outer end of passage 46 in turn is plugged by a headed plug 54 whose stem is spaced from the plug 49 and has an axial bore 55 and radial port 56 communicating with a groove 57 to establish a flow path to the passageway 47. Intermediate the plug 49 and the stem of plug 54 is a longitudinal passageway 59 opening into a transverse passageway 60 which in turn communicates with a circumferential groove 61 which is sealed against leakage by the O ring 62. The groove 61 communicates at its upper end as viewed in Fig. 1 with the passageways 63 and 64 going to the valve passageway 51.

In accordance with the invention, the metering valve 50 has been provided in order to control both the flow of fuel into the passageway 64 and the flow of fuel into the passageway 52. The valve 50 is of cylindrical shape and dimensioned to have a sliding fit within the valve passage 51 so that it can be rotated and also so that it can be adjusted axially to a limited extent.

The valve 50 is provided with a central bore 59 and a helically extending slot 70 within the sleeve wall which is adapted to register with the longitudinal passage 64. The valve 50 also has a vertically extending or longitudinal slot 71 arranged in a position so as to lie generally opposite the helical slot 70 for registry with the inclined passage 52. The arrangement is such that as the valve 50 is turned to move slot 71 out of registry with passageway 52 to decrease the flow of fuel to the engine, the slot 70 is brought into registry with passage 64 to by-pass fuel to the cam actuating mechanism and, conversely, when the valve 50 is turned to move slot 71 into full registry with passageway 52, the slot 70 is moved out of registry with passage 64. The valve 50 is adapted to be turned by the radially extending actuating arm 72 fixed to its outer end and connected by link 73 to suitable speed control means.

The valve 50 is urged outwardly by the fuel pressure in the valve passageway 51 but its outward movement and hence axial position is fixed by the stop 74 which is a rod threadably mounted in the wall 75. The rod 74 has a conical cam portion 76 against which the outer end of valve 50 is adapted to abut and hence the axial position of valve 50 may be adjusted in a simple manner by turning the rod 74 in or out. The purpose of this axial adjustment of valve 50 is to take care of manufacturing tolerances and minor variations in the characteristics of the engines with which the fuel pump is to be used. As will be readily understood, variations in the axial position of the valve 50 will not vary the registry of longitudinal slot 71 with passage 52 but it will vary the registry of diagonal slot with passage 64. Thus the valve can be set to produce the exact amount of by-pass to passage 64 desired when valve 50 is turned in a direction to close the passage 52.

It is believed that the operation of the cam advancing mechanism will be fully understood from the foregoing description taken with the following description of operation. When the pump is in operation being driven by the associated engine, fuel is fed by the feed pump 27 through the longitudinal passageway 44, transverse passageway 45 and rotor groove 48 to the valve 50. If the motor is operating at full speed and high load, the valve 50, of necessity, is turned to cause substantially full registry of longitudinal slot 71 with passage 52 thus producing a high rate of fuel feed to the injection pump 14. Under these conditions the diagonal slot 70 is out of registry with the passageway 64 so that no fuel is being by-passed to the cam control piston 40. As a result the cam 34 is in fully retarded position as a result of the bias of spring loaded piston 39 acting upon the arm 35.

Assuming that the load is now removed from the engine, the operator or a governor will turn the valve 50 to reduce the registry of longitudinal slot 71 with passage 52 to reduce the fuel flow to the engine and thus prevent racing of the engine. When the valve is thus turned to so-called "fast idle" position, the diagonal slot 70 is brought into registry with passageway 64 thus admitting fuel to the passage 64 and from thence through the passageways described to the cam control piston 40. As previously mentioned the amount of registry of slot 70 with passage 64 under these conditions of operation can be adjusted by turning the rod 74 without changing the effective setting relative to passage 52.

Inasmuch as the associated engine and hence the transfer pump 27 are operating at high speed under the conditions just assumed, the fuel by-passed to passage 64 and hence operative on piston 40 is at or near the maximum pressure output of the pump 27. Accordingly the piston 40 is moved to the left as viewed in Fig. 3 causing the cam 34 to move to advanced timing position.

In the event there is a subsequent change of operating conditions such a reduction in speed causing a drop in the fuel pressure from the transfer pump 27 or the valve 50 is turned to increase the amount of fuel going to the engine with a resultant decrease in registry of slot 70 with passageway 64, or both, the ball valve 43 will close, but the cam 34 will be returned to retarded timing position by the spring pressed plunger 39 as the pressure on piston 40 is relieved by leakage past the piston 40 for release through passage 35' of arm 35.

Thus it will be seen that the position of cam 34 either to advance or retard the timing of the pump is responsive to both engine load and engine speed and so arranged to provide an advance of the timing when the associated engine is operated under high speed, no load conditions.

I claim:

1. In a fuel injection system, a fuel injection pump, first control means for varying the output of the pump, second control means for varying the timing of the pump, and means responsive to movement of the first control means for concomitantly setting the second control means to advance the timing upon decrease in output of the pump.

2. In a fuel injection system, a fuel injection pump, a source of fuel under pressure, pressure responsive means for advancing the timing of the pump, means for varying the output of the pump, and means responsive to the last-named means for admitting fuel from said source to the pressure responsive means when the output of the pump is reduced.

3. In a fuel injection system, a fuel injection pump having a normally stationary cam which is adjustable to vary the timing of the pump, fluid pressure actuatable means for moving the cam in a direction to advance the timing of the fuel injection pump, a transfer pump adapted to be driven by an associated engine, control means for varying the output of the fuel injection pump, and means for connecting the fluid pressure actuatable means to the transfer pump when the control means is operated to reduce the output of the fuel injection pump.

4. In a fuel injection system of the type having a fuel injection pump provided with a normally stationary cam which is adjustable to vary the timing of the fuel injection pump and control means for varying the output of the pump, fluid pressure actuatable means for advancing the position of the cam responsive to increase in fluid pressure, a source of fuel under pressure, a fuel conducting passage between the fluid pressure actuatable means and the source of fuel under pressure, and adjustable valve means actuated by said control means for varying the effective opening of said passage.

5. In a fuel injection system of the type having a fuel injection pump provided with a normally stationary cam which is adjustable to vary the timing of the fuel injection pump, fluid pressure actuatable means for advancing the position of the cam responsive to increase in fluid pressure, a source of fuel under pressure, a fuel conducting passage between the fuel injection pump and the source of fuel under pressure, a fuel conducting passage between the fluid pressure actuatable means and the source of fuel under pressure, and means for concomitantly varying the flow of fuel through said passages.

6. In a fuel injection system of the type having a fuel injection pump provided with a normally stationary cam which is adjustable to vary the timing of the fuel injection pump, and having a source of fuel under pressure responsive to the speed of an associated engine, fluid pressure actuatable means for adjusting the cam to advance the timing of the fuel injection pump responsive to increase in fluid pressure, a passage for conducting fuel from the source of fuel under pressure to the fuel injection pump, a passage for conducting fuel from the source of fuel under pressure to the fluid pressure actuatable means, and valve means for concomitantly varying the effective openings of both said passages.

7. In a fuel inection system, a fuel injection pump having a normally stationary cam which is adjustable to vary the timing of the fuel injection pump, pressure responsive means for moving the cam in a direction to advance the timing of the fuel injection pump responsive to increase in fluid pressure, a fuel transfer pump adapted to be driven by an associated engine, means forming a first fuel flow path from the transfer pump to the injection pump, means forming a second fuel flow path from the transfer pump to said pressure responsive means, and valve means for concomitantly reducing the flow of fuel in the first fuel flow path to reduce the ouput of the pump and increasing the flow of fuel in the second fuel flow path to advance the timing of the pump.

8. In a fuel injection system, a fuel injection pump having a normally stationary cam which is adjustable to vary the timing of the fuel injection pump, pressure responsive means for moving the cam in a direction to advance the timing of the fuel injection pump, a fuel transfer pump adapted to be driven by an associated engine, means forming a fuel conducting passage between the transfer pump and the pressure responsive means and the fuel injection pump, and a three-way valve in said passage for opening the passage to the pressure responsive means while reducing the passage to the fuel injection pump.

9. In a fuel injection system, a fuel injection pump having a normally stationary cam which is adjustable to vary the timing of the fuel injection pump, pressure responsive means for moving the cam in a direction to advance the timing of the fuel injection pump, a fuel transfer pump adapted to be driven by an associated engine, means forming a fuel conducting passage between the transfer pump and the fuel injection pump, a movable metering valve in said passage, and a fluid by-pass connected to the fluid responsive means arranged to be opened by the metering valve when the metering valve is moved in a direction to reduce the flow of fuel to the fuel injection pump.

10. In a fuel injection system, a fuel injection pump having a normally stationary cam which is adjustable to vary the timing of the fuel injection pump, pressure responsive means for moving the cam in a direction to advance the timing of the fuel injection pump, a fuel transfer pump adapted to be driven by an associated engine, a valve chamber having a first and second port communicating with the fuel injection pump and the pressure responsive means, respectively, means forming a fuel passage between the valve chamber and the transfer pump, and a movable control valve for simultaneously closing the first port and opening the second port.

11. In a fuel injection system, a fuel injection pump having a normally stationary cam which is adjustable to vary the timing of the fuel injection pump, pressure responsive means for moving the cam in a direction to advance the timing of the fuel injection pump, a fuel transfer pump adapted to be driven by an associated engine, a cylindrical valve chamber having circumferentially spaced first and second ports communicating with the fuel injection pump and the pressure responsive means, respectively, means forming a fuel passage between the valve chamber and the transfer pump, and a rotatable cylindrical valve in said valve chamber having port means movable into registry selectively with said first and second ports.

12. In a fuel injection system, a fuel injection pump having a normally stationary cam which is adjustable to vary the timing of the fuel injection pump, pressure responsive means for moving the cam in a direction to advance the timing of the fuel injection pump, a fuel transfer pump adapted to be driven by an associated engine, a cylindrical valve chamber having circumferentially spaced first and second ports communicating with the fuel injection pump and the pressure responsive means, respectively, means forming a fuel passage between the valve chamber and the transfer pump, and a rotatable cylindrical valve in said valve chamber having circumferentially spaced openings for registry with said ports, said openings being spaced a lesser distance apart than the ports so as to provide for diminishing registry with one port during increasing registry with the other.

13. In a fuel injection system, a fuel injection pump having a normally stationary cam which is adjustable to vary the timing of the fuel injection pump, pressure responsive means for moving the cam in a direction to advance the timing of the fuel injection pump, a fuel transfer pump adapted to be driven by an associated engine, a cylindrical valve chamber having circumferentially spaced first and second ports communicating with the fuel injection pump and the pressure responsive means, respectively, means forming a fuel passage between the valve chamber and the transfer pump, a rotatable cylindrical valve in said valve chamber having a longitudinal slot for registry with one port and an inclined slot for registry with the other port, and means for adjusting the axial position of the valve to vary the ratio of registry of the slots with the ports.

14. In a fuel injection system, a fuel injection pump having a normally stationary cam which is adjustable to vary the timing of the fuel injection pump, pressure responsive means for moving the cam in a direction to advance the timing of the fuel injection pump, a fuel transfer pump adapted to be driven by an associated engine, a cylindrical valve chamber having circumferentially spaced first and second ports communicating with the fuel injection pump and the pressure responsive means, respectively, means forming a fuel passage between the valve chamber and the transfer pump, a rotatable cylindrical valve in said valve chamber having a longitudinal slot for registry with the first port and an inclined slot for registry with the second port, means for turning the valve, and an adjustable cam for axially positioning the valve.

References Cited in the file of this patent

UNITED STATES PATENTS

| | | |
|---|---|---|
| 2,177,120 | Schaeren | Oct. 24, 1939 |
| 2,305,308 | Fischlmayr | Dec. 15, 1942 |
| 2,372,180 | Edwards | Mar. 27, 1945 |
| 2,660,992 | Roosa | Dec. 1, 1953 |

FOREIGN PATENTS

| | | |
|---|---|---|
| 314,800 | Great Britain | June 5, 1930 |
| 840,029 | Germany | May 26, 1952 |